(12) United States Patent
Ding

(10) Patent No.: US 10,049,671 B2
(45) Date of Patent: *Aug. 14, 2018

(54) MANAGEMENT OF VOICE COMMANDS FOR DEVICES IN A CLOUD COMPUTING ENVIRONMENT

(71) Applicant: International Business Machines Corporation, Armonk, NY (US)

(72) Inventor: Chandler F. Ding, Amherst, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,063

(22) Filed: Aug. 23, 2016

(65) Prior Publication Data

US 2016/0365094 A1 Dec. 15, 2016

Related U.S. Application Data

(63) Continuation of application No. 14/834,212, filed on Aug. 24, 2015, now Pat. No. 9,472,192, which is a
(Continued)

(51) Int. Cl.
*G10L 15/16* (2006.01)
*G10L 15/30* (2013.01)
(Continued)

(52) U.S. Cl.
CPC ............. *G10L 15/30* (2013.01); *G10L 15/22* (2013.01); *G10L 15/26* (2013.01); *G10L 17/22* (2013.01)

(58) Field of Classification Search
USPC .......................... 704/2–9, 203–277
See application file for complete search history.

(56) References Cited

U.S. PATENT DOCUMENTS 9,424,832 B1 * 8/2016 Isaac .................. G10L 13/00
2011/0153868 A1 6/2011 Castleberry
(Continued)

OTHER PUBLICATIONS

"Smart Voice Control Framework", dated Aug. 11, 2010, an IP.com Prior Art Database Technical Disclosure, IP.com No. IPCOM000198631D, Total 10 pages.
(Continued)

*Primary Examiner* — Marcellus Augustin
(74) *Attorney, Agent, or Firm* — Rabindanath Dutta; Konrad Raynes Davda and Victor LLP

(57) ABSTRACT

Provided is a lightweight computational device that is configured to be in communication with a cloud both directly and via a smart computational device. The lightweight computational device receives a voice command from a user, wherein the lightweight computational device does not have adequate processing power to convert the voice command to a text command. The voice command is transmitted from the lightweight computational device to a smart computational device, wherein the smart computational device uses voice recognition to convert the voice command to a text command in the smart computational device, and transmits the text command for being processed by that cloud that provides at least one of voice recognition service and other services. The lightweight computational device receives a data response for the user from the cloud, via the smart computational device, based on the other services provided by the cloud.

18 Claims, 9 Drawing Sheets

Related U.S. Application Data continuation of application No. 14/505,149, filed on Oct. 2, 2014, now Pat. No. 9,443,520.

(51) Int. Cl.
*G10L 15/26* (2006.01)
*G10L 15/22* (2006.01)
*G10L 17/22* (2013.01)

(56) References Cited

U.S. PATENT DOCUMENTS

| | | | |
|---|---|---|---|
| 2012/0197523 | A1 | 8/2012 | Kirsch |
| 2013/0124207 | A1 | 5/2013 | Sarin et al. |
| 2013/0218573 | A1 | 8/2013 | Cheng et al. |
| 2013/0317827 | A1 | 11/2013 | Fu et al. |
| 2013/0332168 | A1* | 12/2013 | Kim ............... G10L 15/22 704/251 |
| 2014/0066132 | A1* | 3/2014 | Burke ............... H04L 67/12 455/569.2 |
| 2014/0067392 | A1 | 3/2014 | Burke et al. |
| 2014/0067403 | A1* | 3/2014 | Burke ............... G10L 15/22 704/275 |
| 2015/0088499 | A1 | 3/2015 | White et al. |

OTHER PUBLICATIONS

US Patent Application, dated Oct. 2, 2014, for U.S. Appl. No. 14/505,149, filed Oct. 2, 2014, invented by Chandler F. Ding, Total 36 pages.
Preliminary Amendment, dated Aug. 24, 2015, for U.S. Appl. No. 14/505,149, filed Oct. 2, 2014, invented by Chandler F. Ding, Total 6 pages.
Office Action, dated Dec. 22, 2015, for U.S. Appl. No. 14/505,149, filed Oct. 2, 2014, invented by Chandler F. Ding et al., Total 26 pages.
Response to Office Action, dated Mar. 22, 2015, for U.S. Appl. No. 14/505,149, filed Oct. 2, 2014, invented by Chandler F. Ding et al., Total 7 pages.
Notice of Allowance, dated May 10, 2016 for U.S. Appl. No. 14/505,149, filed Oct. 2, 2014, invented by Chandler F Ding et al., Total 17 pages.
US Patent Application, dated Aug. 24, 2015, for U.S. Appl. No. 14/834,212, filed Aug. 24, 2015, invented by Chandler F. Ding, Total 36 pages.
Preliminary Amendment, dated Aug. 24, 2015, for U.S. Appl. No. 14/834,212, filed Aug. 24, 2015, invented by Chandler F Ding, Total 6 pages.
Office Action, dated Feb. 1, 2015, for U.S. Appl. No. 14/834,212, filed Aug. 24, 2015, invented by Chandler F. Ding, Total 21 pages.
Response to Office Action, dated May 20, 2016, for U.S. Appl. No. 14/834,212, filed Aug. 24, 2015, invented by Chandler F. Ding, Total 5 pages.
Supplemental Amendment, dated Jun. 24, 2016, for U.S. Appl. No. 14/834,212, filed Aug. 24, 2015, invented by Chandle F. Ding, Total 7 pages.
Notice of Allowance, dated Jul. 12, 2016, for U.S. Appl. No. 14/834,212, filed Aug. 24, 2015, invented by Chandler F. Ding, Total 23 pages.
List of Related Applications, pp. 2, dated Aug. 23, 2016.

\* cited by examiner

MANAGEMENT OF VOICE COMMANDS FOR DEVICES IN A CLOUD COMPUTING ENVIRONMENT

CROSS-REFERENCE TO RELATED APPLICATIONS

This application is a continuation of application Ser. No. 14/834,212 filed on Aug. 24, 2015, wherein application Ser. No. 14/834,212 is a continuation of application Ser. No. 14/505,149 filed on Oct. 2, 2014, wherein application Ser. No. 14/834,212 and application Ser. No. 14/505,149 are incorporated herein by reference in their entirety.

BACKGROUND

1. Field

Embodiments are related to the management of voice commands for devices in a cloud computing environment.

2. Background

Voice or speech recognition is the translation of spoken words into text. It is also known as "automatic speech recognition", "computer speech recognition", "speech to text". Some voice recognition systems use "speaker-independent voice recognition" while others use "training" where an individual speaker reads sections of text into the voice recognition system. These systems analyze the person's specific voice and use it to fine-tune the recognition of that person's speech, resulting in more accurate transcription. Voice recognition applications may execute on smartphones, personal computers, or any other suitable devices. Users may interact with such smartphones or personal computers by using their speech. Users may of course also interact via other interaction mechanisms, such as, keyboards.

Cloud computing is the delivery of computing as a service rather than a product. In cloud computing, shared resources, software, and information are provided to computers and other devices as a utility over a network, such as the Internet.

SUMMARY OF THE PREFERRED EMBODIMENTS

Provided are a method, a system, and a computer program in which a lightweight computational device is configured to be in communication with a cloud both directly and via a smart computational device. The lightweight computational device receives a voice command from a user, wherein the lightweight computational device does not have adequate processing power to convert the voice command to a text command. The voice command is transmitted from the lightweight computational device to a smart computational device, wherein the smart computational device uses voice recognition to convert the voice command to a text command in the smart computational device, and transmits the text command for being processed by the cloud that provides at least one of voice recognition service and other services. The lightweight computational device receives a data response for the user from the cloud, via the smart computational device, based on the other services provided by the cloud.

In additional embodiments, the other services provided by the cloud are used to generate the data response by executing the text command received from the smart computational device. The cloud transmits the data response to the smart computational device.

In further embodiments, the cloud is comprised of one or more computational devices.

In yet additional embodiments, the lightweight computational device is an in-car voice interaction system, and the smart computational device is a smartphone that interacts with the cloud via a wireless communications protocol.

In additional embodiments, the lightweight computational device receives another voice command from the user. The lightweight computational device transmits the another voice command to the cloud, without the another voice command being transmitted via the smart computational device, wherein the another voice command is converted to another text command in the cloud via the voice recognition services, and where one or more of the other services provided by the cloud are used to generate another data response by executing the another text command. The lightweight computational device receives the another data response from the cloud, without the another data response being transmitted through the smart computational device. In certain embodiments, computational devices that provide the at least one of voice recognition services and the other services in the cloud have a relatively greater processing power than the lightweight computational device.

BRIEF DESCRIPTION OF THE DRAWINGS

Referring now to the drawings in which like reference numbers represent corresponding parts throughout.

DETAILED DESCRIPTION

Figure 1:
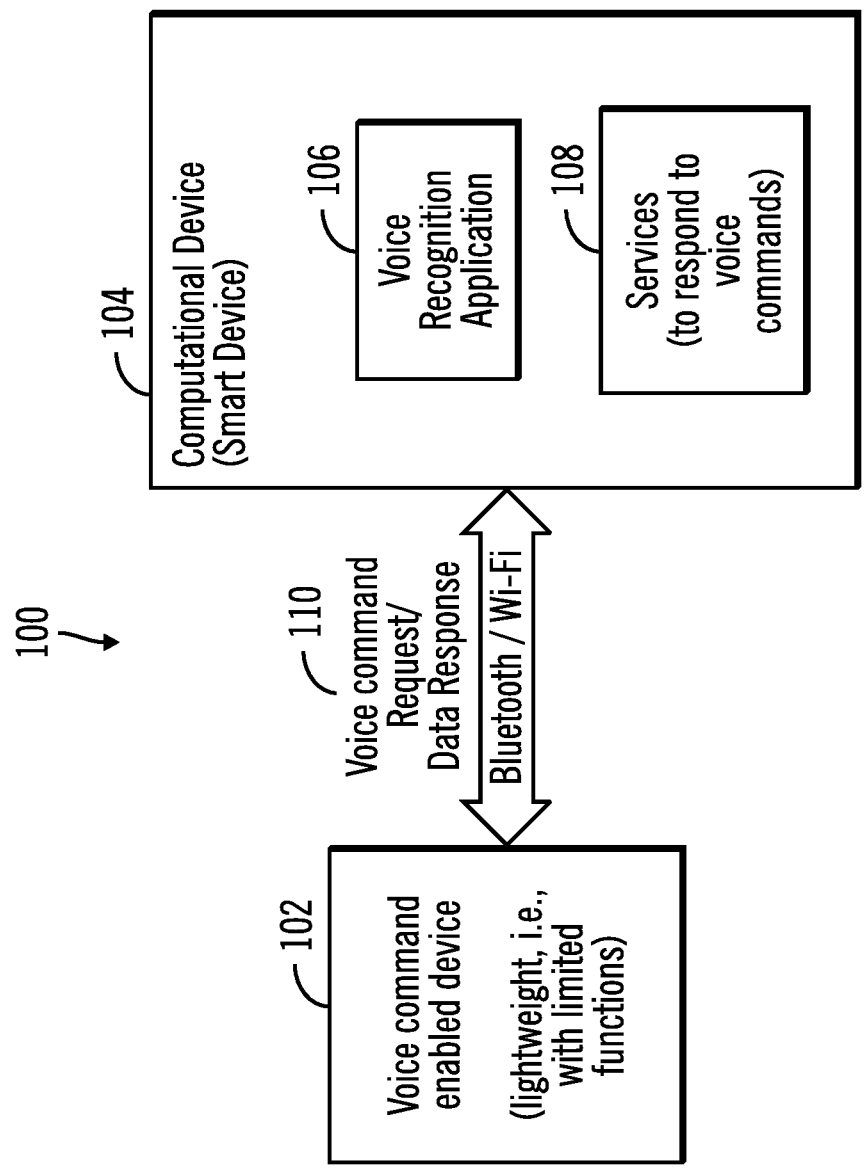
FIG. 1 illustrates a block diagram of a computing environment in which a voice command enabled device interacts with a computational device, in accordance with certain embodiments.

In the following description, reference is made to the accompanying drawings which form a part hereof and which illustrate several embodiments. It is understood that other embodiments may be utilized and structural and operational changes may be made.

Voice Command Based Devices

There are many different kinds of devices or systems that are capable of responding to various voice commands. However, the number and complexity of voice commands that a device can understand and act upon, depends on the speech recognition engine and the computing intelligence packaged within the device. Some of the devices are very smart, such as mobile phones running a variety of operating systems, while others are less intelligent, such as in-car voice command systems, home automation systems, or automated voice prompts in telephony banking, etc.

In certain situations specific devices that understand the specific voice commands have to be used to perform specific tasks. These are all voice enabled devices. However, the devices may not be enabled to perform all tasks. For example, a user may find out while driving that he forgot to enable the home security system before leaving home. Instead of having to take out his mobile phone out to use an application to enable the home security system, certain embodiments may allow the user to use the in-car voice interaction system to invoke application services to enable the home security system.

Certain embodiments enable any voice command capable device to understand and act upon unified or standardized voice commands, by accessing applications and services in a cloud computing environment via standardized communication protocols. As a result, such voice command enabled devices are much more intelligent and useful, while at the same time are more lightweight (i.e., less processing power, memory, and other resources are needed in such voice command enabled devices). There is no need to find specific devices to perform specific tasks, and all voice command enabled devices may be configured to perform the tasks.

Additionally, voice recognition capability may be improved without upgrading the device itself, as the capability for voice recognition is no longer with the device itself but is hosted in the cloud.

In certain embodiments, voice command, speech recognition, and computing intelligence do not have to be resident in one device unit. The front-end voice command capable devices may be implemented as a lightweight device. The main responsibility of such front-end voice command capable devices may be in accepting the voice commands and routing the corresponding requests to the cloud. The front-end devices may not be responsible for how the requests are handled. The cloud or other connected smart devices may handle the requests and respond with the data. The back-end cloud may focus on developing and contributing applications and services that may provide a user with more and more useful data.

The disclosure, provides certain embodiments in which a lightweight computational device interacts with a cloud either directly or via a smart computational device to respond to voice commands received from a user.

Exemplary Embodiments

FIG. 1 illustrates a block diagram of a computing environment 100, in which a voice command enabled device 102 interacts with a computational device 104, in accordance with certain embodiments.

In certain embodiments, the voice command enabled device 102 is a lightweight device, i.e., a device with limited functions. For example, in an exemplary embodiment, the voice command enabled device 102 may have a relatively simple processor, a limited amount of memory, an operating system with limited functions, and a voice receiving and transmitting application. For example, the lightweight computational device is an in-car voice interaction system, a wearable computing device, etc. The voice command enabled device 102 does not have any voice recognition application as the execution of voice recognition application is computationally intensive and cannot be performed on the lightweight voice command enabled device 102.

The computational device 104 may comprise any suitable computational device including those presently known in the art, such as, a smartphone, a personal computer, a workstation, a server, a mainframe, a hand held computer, a palm top computer, a telephony device, a network appliance, a blade computer, a processing device, etc. It should be noted that the computational device 104 is not a lightweight device. In certain embodiments, the computational device 104 executes a voice recognition application 106 and executes other applications that provide various services 108 (e.g., map navigation services, store finder services, telephone dialing services, etc.). The computational device 104 may also be referred to as a smart device 104, as it executes applications such as the voice recognition application 106 and the services 108, in contrast to the voice command enabled device 102 which is a lightweight device that executes simple operations such as voice and information receiving and transmitting operations.

In certain embodiments, the voice command enabled device 102 communicates with the computational device 104 over a wireless communications protocol such as Bluetooth or Wi-Fi. Other wireless or wired communications protocol may also be used for the communications between the voice command enabled device 102 and the computational device 104.

In certain embodiments, the lightweight voice command enabled device 102 may receive a voice command from a user and then transmit the voice command request (shown via reference numeral 110) to the smart computational device 104. The smart computational device 104 uses the voice recognition application 106 to recognize the voice commands and then uses the services 108 to generate information for the user, where the generated information is sent as a data response (shown via reference numeral 110) to the user. Therefore, in certain embodiments a lightweight voice command enabled device 102 interacts with a user and uses the smart computational device 104 to generate information for the user.

Figure 2:
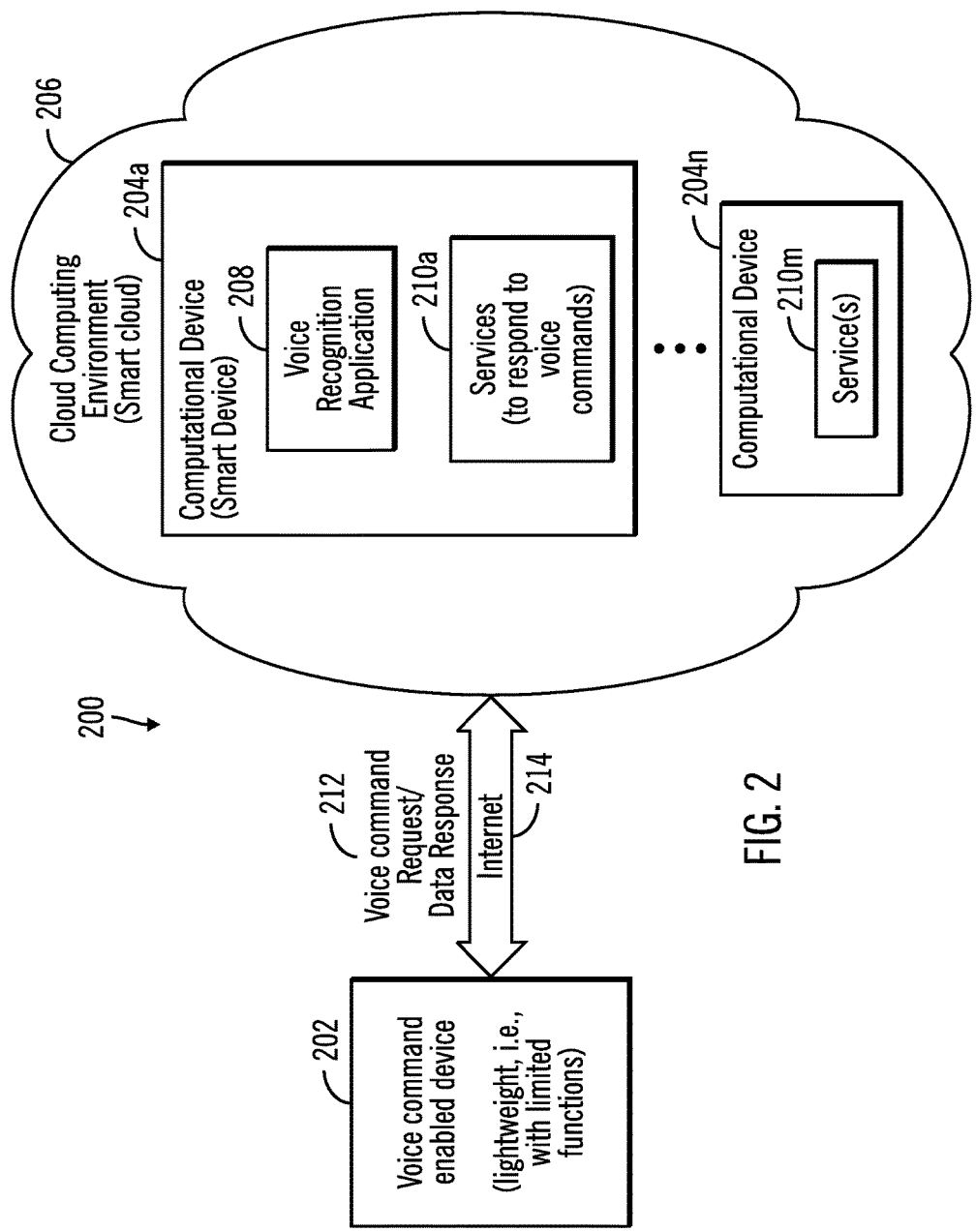
FIG. 2 illustrates a block diagram of a computing environment in which a voice command enabled device interacts with computational devices maintained in a cloud computing environment, in accordance with certain embodiments.

FIG. 2 illustrates a block diagram of a computing environment 200 in which a voice command enabled device 202 interacts with computational devices 204a . . . 204n maintained in a cloud computing environment 206, in accordance with certain embodiments. The cloud computing environment 206 may also be referred to as a smart cloud, because the cloud computing environment 206 may perform complex tasks such as voice recognition and provides various services (e.g., map navigations, telephony services, etc.) to the lightweight voice command enabled device 202.

The voice command enabled device 202 is a lightweight device with limited functions. For example, the lightweight computational device is an in-car voice interaction system, a wearable computing device, etc. The voice command enabled device 202 receives and transmits voice commands and receives a data response from the cloud computing environment 206.

At least one computational device 204a of the computational devices 204a . . . 204n executes a voice recognition application 208 that recognizes the voice commands transmitted by the voice command enabled device 202 to the smart cloud 206. A plurality of services 210a . . . 210m are provided by one or more of the computational device 204a . . . 204n.

In certain embodiments, the lightweight voice command enabled device 104 may receive a voice command from a user and then transmit the voice command request (shown via reference numeral 212) to the smart cloud 206. One or more computational devices in the smart cloud 206 uses the voice recognition application 208 to recognize the voice commands and the uses the services 210a . . . 210m to generate information for the user, where the generated information is sent as a data response (shown via reference numeral 212) to the user over a network, such as the Internet 214.

Therefore, in certain embodiments shown in FIG. 2, a lightweight voice command enabled device 202 interacts with a user and uses the smart cloud 206 to generate information for the user.

Figure 3:
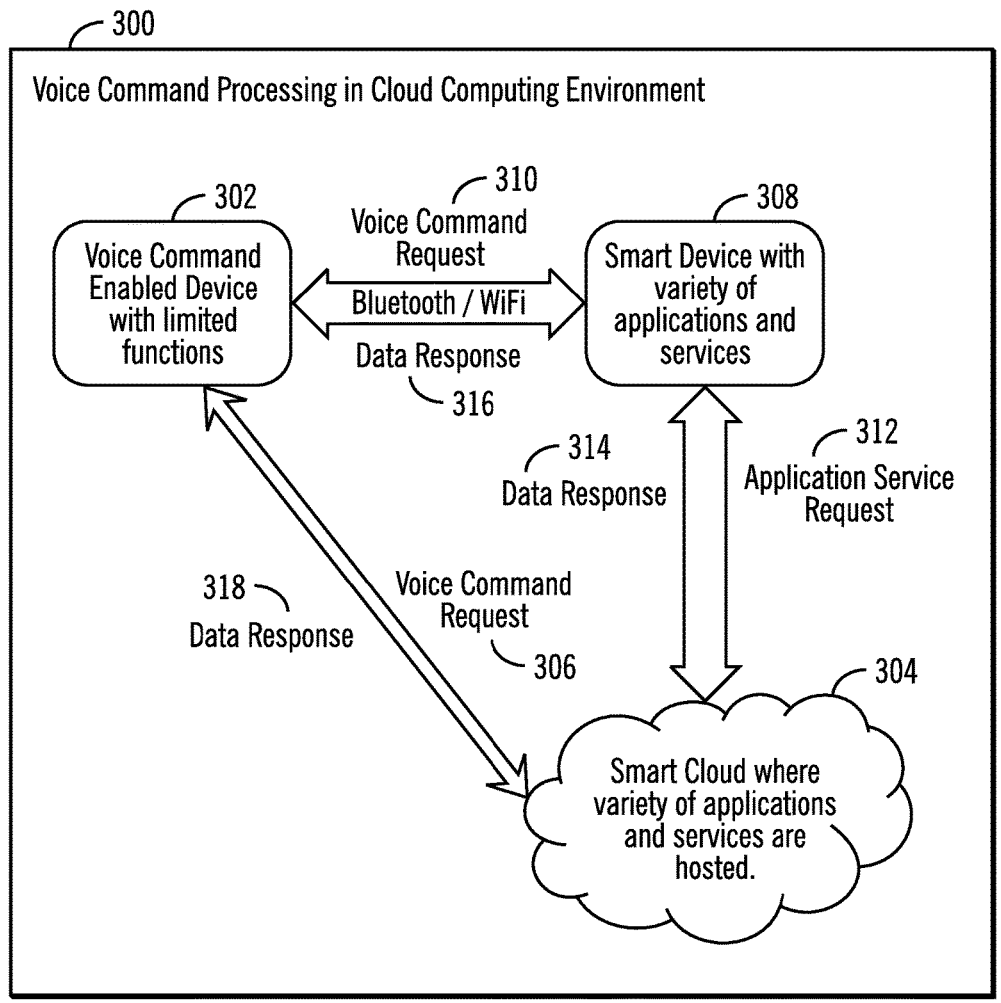
FIG. 3 illustrates a block diagram of a computing environment in which a voice command enabled device interacts with a cloud in which a variety of applications and services are hosted, either directly or via a smart device, in accordance with certain embodiments.

FIG. 3 illustrates a block diagram of a computing environment 300 in which a voice command enabled device 302 with limited functions interacts with a smart cloud 304 in which a variety of applications and services are hosted. The interaction between the voice command enabled device 302 and the smart cloud 304 may be performed directly in certain embodiments (as shown via reference numeral 306 as described in FIG. 2). In other embodiments, the voice command enabled device 302 indirectly interacts with the smart cloud 304 via a smart device 308 (e.g., a smart computational device).

In certain embodiments, the lightweight voice command enabled device 302 may receive a voice command request from a user and then transmit the voice command request (shown via reference numeral 310) to the smart computational device 308. The smart computational device 308 may optionally use a voice recognition application to recognize the voice command request and then send an application service request 312 to the smart cloud 304. The smart cloud 304 generates a data response from the services that execute in the smart cloud 304 and generates a data response 314 for the smart device 304. The smart device 304 may forward the data response 314 in a format suitable for the voice command enabled device 302 (as shown via reference numeral 316).

In certain embodiments, the voice command enabled device 302 communicates with the smart cloud 304 over a wireless communications protocol, such as Bluetooth, Wi-Fi, Long Term Evolution (LTE), etc. Other wireless or wired communications protocol may also be used for the communications between the voice command enabled device 302 and the smart cloud 304.

In certain embodiments, the lightweight voice command enabled device 302 may receive a voice command from a user and then transmit the voice command request (shown via reference numeral 306) to the smart cloud 304. Computational devices that execute in the smart cloud 304 may use a voice recognition application to recognize the voice commands and use one or more services to generate information for the user, where the generated information is sent as a data response (shown via reference numeral 318) to the user. Therefore, in certain embodiments a lightweight voice command enabled device 302 interacts with a user and uses the smart cloud 304 to generate information for the user.

Therefore FIG. 3 illustrates certain computing environments in which a lightweight voice command enabled device 302 interacts directly or indirectly with a smart cloud 304 and provides information generated within the smart cloud 304 to users that interact via voice commands with the voice command enabled device 302.

Figure 4:
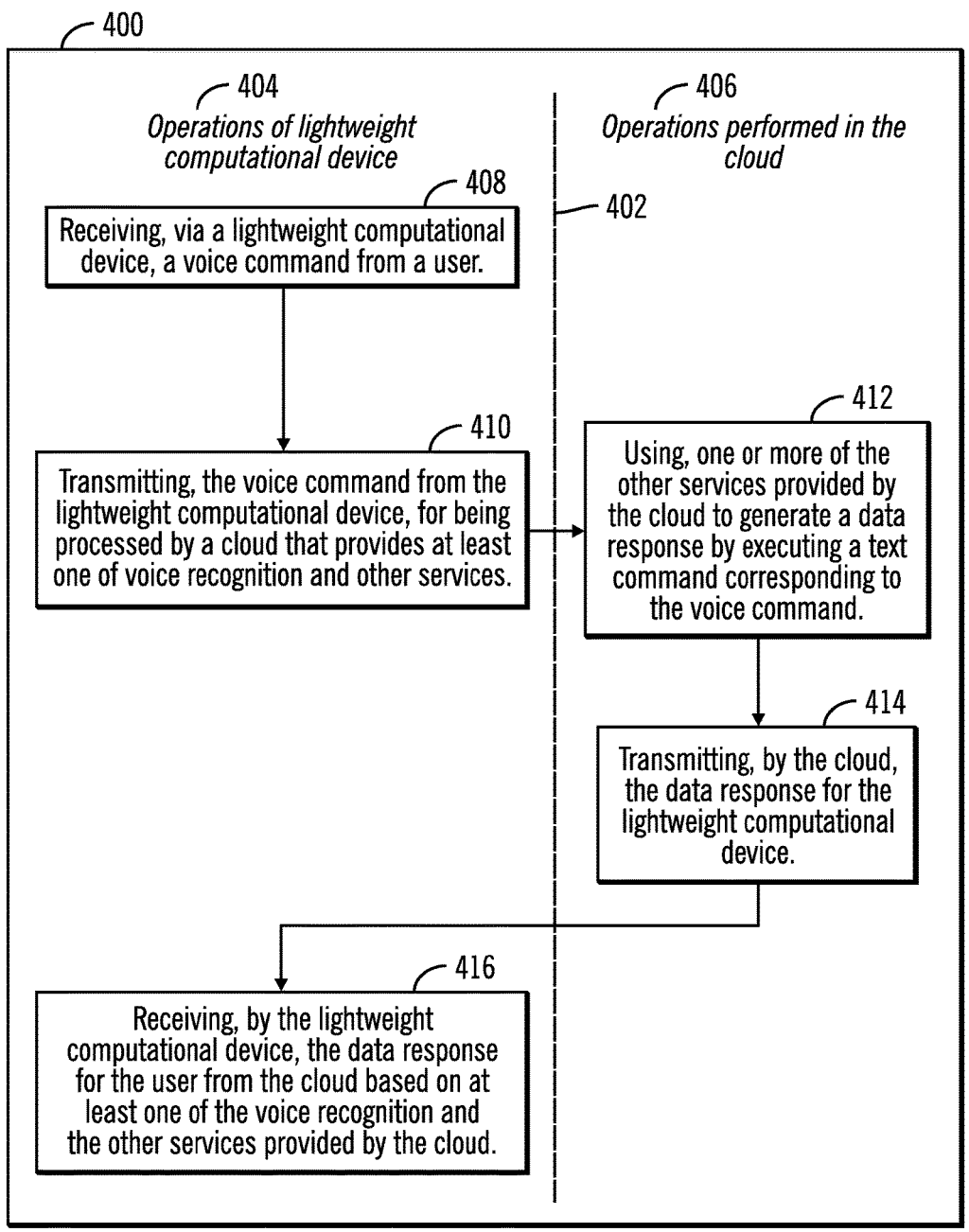
FIG. 4 illustrates a flowchart that shows operations performed by a lightweight computational device and a cloud, in accordance with certain embodiments.

FIG. 4 illustrates a flowchart 400 that shows operations performed by a lightweight computational device 302 and a cloud 304, in accordance with certain embodiments. In FIG. 4, the operations shown to the left of the dashed line 402 are performed by the lightweight computational device 302, and the operations shown to the right of the dashed line 402 are performed by the cloud 304 (as shown via reference numerals 404, 406).

Control starts at block 408 in which a lightweight computational device 302 receives a voice command from a user. The lightweight computational device 302 transmits (at block 410) the voice command for being processed by a cloud 304 that provides at least one of voice recognition and other services.

Control proceeds to block 412 in which the cloud 304 uses one or more of the other services provided by the cloud 304 to generate a data response, by executing a text command corresponding to the voice command. In certain embodiments, the text command is generated from the voice command via voice recognition within the cloud 308 prior to executing the text command. The cloud transmits (at block 414) the data response to the lightweight computational device 302.

Control proceeds to block 416 in which the lightweight computational device 302 receives the data response for the user from the cloud, based on at least one of the voice recognition and the other services provided by the cloud. The lightweight computational device 302 provides the data response to the user, in the response to the voice command received from the user.

Therefore, FIG. 4 illustrates certain embodiments in which a lightweight computational device 302 sends voice commands of a user to a cloud 304 to receive a data response for a user.

Figure 5A:
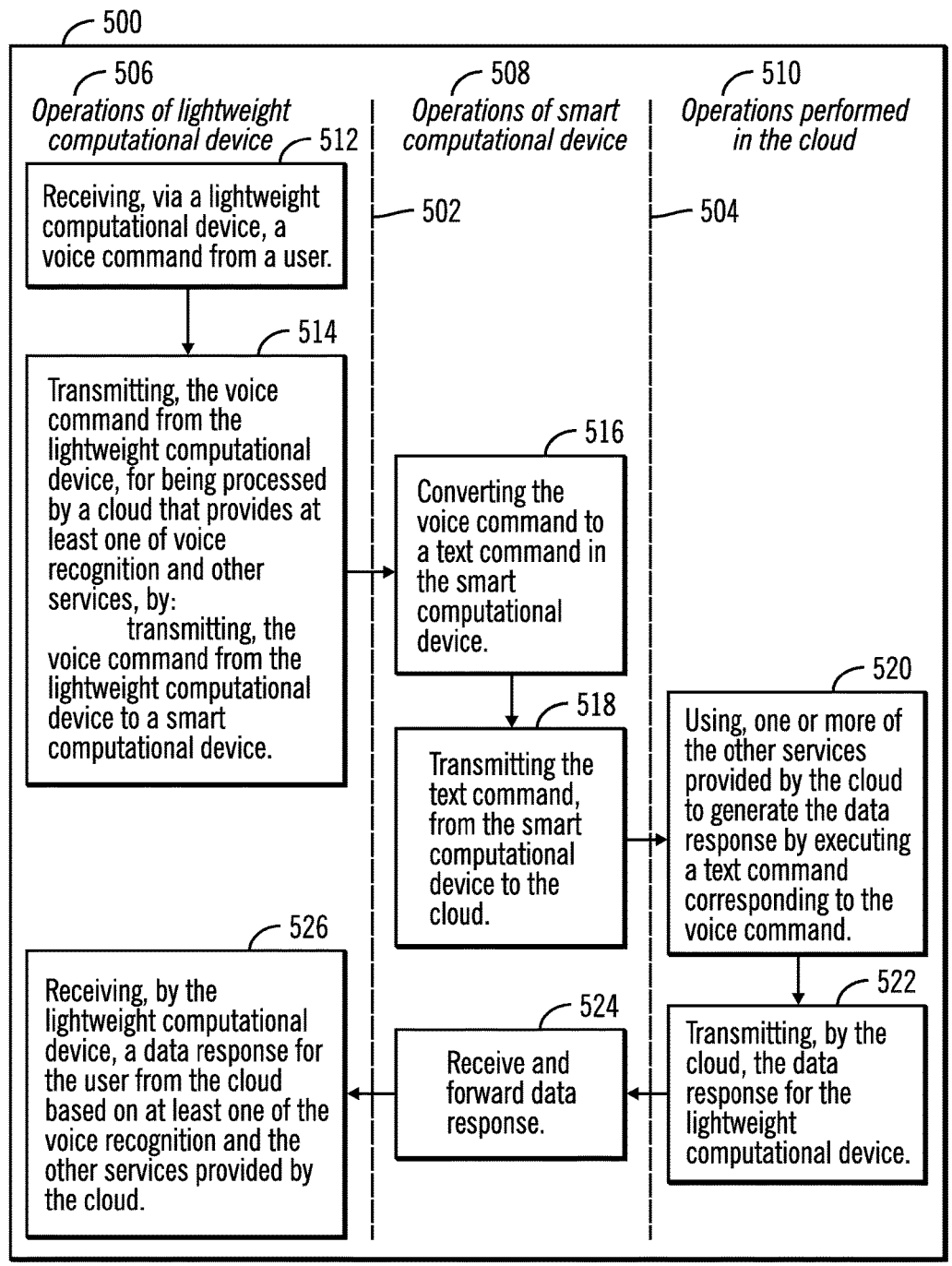
FIG. 5A illustrates a flowchart that shows operations performed by a lightweight computational device, a smart computational device, and a cloud, in accordance with certain embodiments.

FIG. 5A illustrates a flowchart 500 that shows operations performed by a lightweight computational device 302, a smart computational device 308, and a cloud 304, in accordance with certain embodiments. In FIG. 5A, the operations shown to the left of the dashed line 502 are performed by the lightweight computational device 302, and the operations shown to the immediate right of the dashed line 502 are performed by the smart computational device 308 (as shown via reference numerals 506, 508). The operations shown to the right of the dashed line 504 are performed by the cloud 304 as shown via reference numeral 510.

Control starts at block 512 in which a lightweight computational device 302 receives a voice command from a user. The lightweight computational device 302 transmits (at block 514) the voice command for being processed by a cloud 304 that provides at least one of voice recognition and other services, by transmitting, the voice command from the lightweight computational device 302 to a smart computational device 308.

Control proceeds to block 516 in which the smart computational device 308 converts the voice command to a text command, and transmits (at block 518) the text command to the cloud 304.

Control proceeds to block 520 in which the cloud 304 uses one or more of the other services provided by the cloud 304 to generate a data response by executing the text command received from the smart computational device 308. The cloud 304 transmits (at block 522) the data response for the lightweight computational device 302 to the smart computational device 308.

From block 522 control proceeds to block 524 in which the smart computational device 308 receives and forwards the data response to the lightweight computational device 302. Control proceeds to block 526 in which the lightweight computational device 302 receives the data response from the smart computational device 308. The lightweight computational device 302 provides the data response to the user in the response to the voice command received from the user.

Figure 5B:
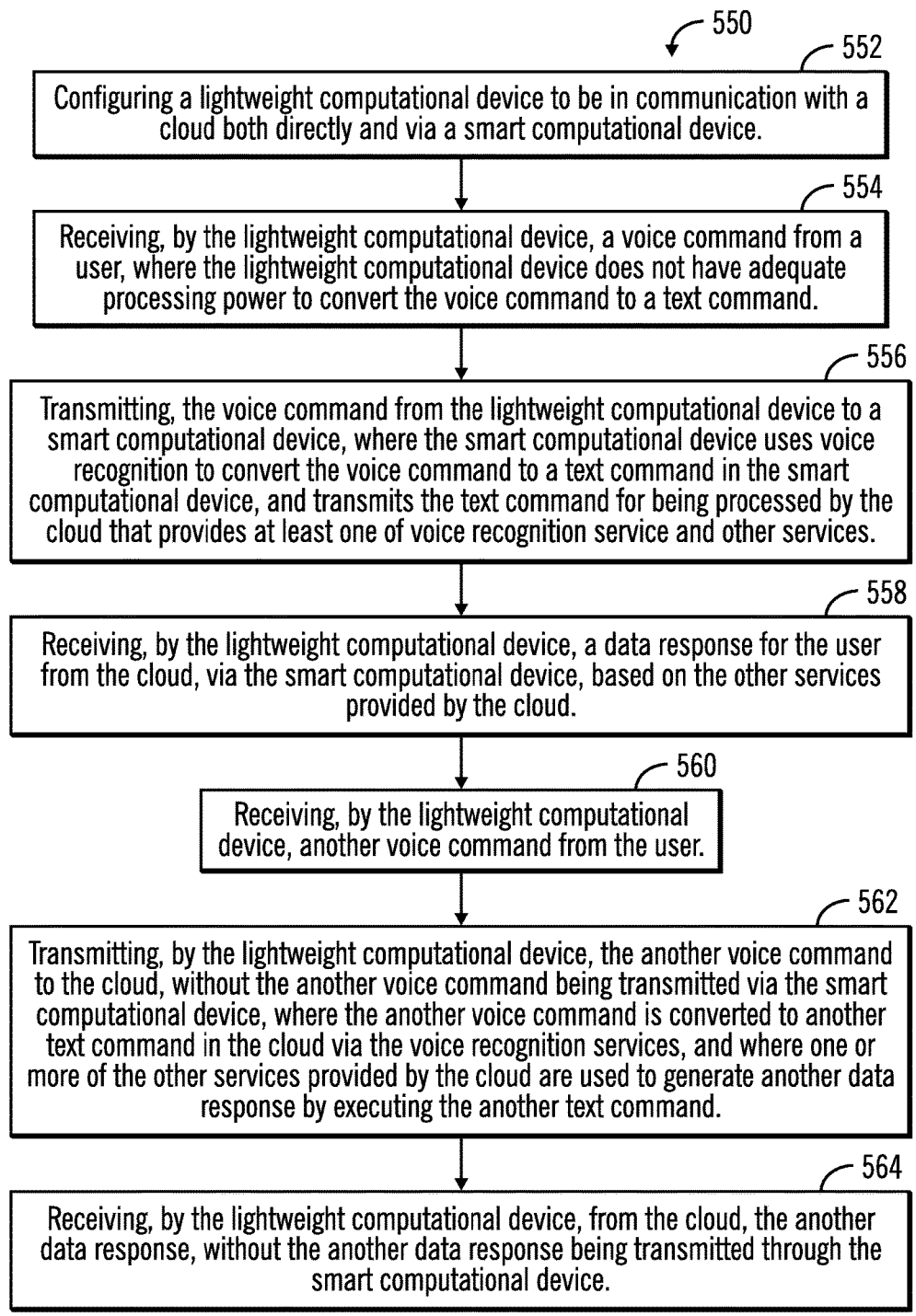
FIG. 5B illustrates another flowchart that shows operations performed by a lightweight computational device that is in communication with a cloud both directly and via a smart computational device, in accordance with certain embodiments.

FIG. 5B illustrates another flowchart 550 that shows operations performed by a lightweight computational device 302 that is in communication with a cloud 304 both directly (i.e., without an intervening smart computational device in the communication path) and via a smart computational device 308 (as shown in at least FIG. 3), in accordance with certain embodiments.

In certain embodiments, the lightweight computational device 302 is configured to be in communication with a cloud 304 both directly and via a smart computational device 308 (block 552). The lightweight computational device 302 receives a voice command from a user, where the lightweight computational device 302 does not have adequate processing power to convert the voice command to a text command (block 554). The voice command is transmitted from the lightweight computational device 302 to a smart computational device 308, where the smart computational device 308 uses voice recognition to convert the voice command to a text command in the smart computational device 308, and transmits the text command for being processed by the cloud 304 that provides at least one of voice recognition service and other services (block 556). The lightweight computational device 302 receives a data response for the user from the cloud, via the smart computational device 308, based on the other services provided by the cloud 304 (block 558).

In additional embodiments, the lightweight computational device 302 receives another voice command from the user (block 560). The lightweight computational device 302 transmits the another voice command to the cloud 304, without the another voice command being transmitted via the smart computational device 308, where the another voice command is converted to another text command in the cloud 304 via the voice recognition services, and where one or more of the other services provided by the cloud 304 are used to generate another data response by executing the another text command (block 562). The lightweight computational device 302 receives the another data response from the cloud, without the another data response being transmitted through the smart computational device 308 (block 564).

In certain alternative embodiments, the lightweight computational device 302 receives the another data response from the cloud 304, with the another data response being transmitted through the smart computational device 308 instead not being transmitted through the smart computational device.

Therefore, FIGS. 1, 2, 3, 4, 5A, 5B illustrate certain embodiments in which a lightweight computational device interacts with a cloud either directly or via a smart computational device to respond to voice commands received from a user.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 6:
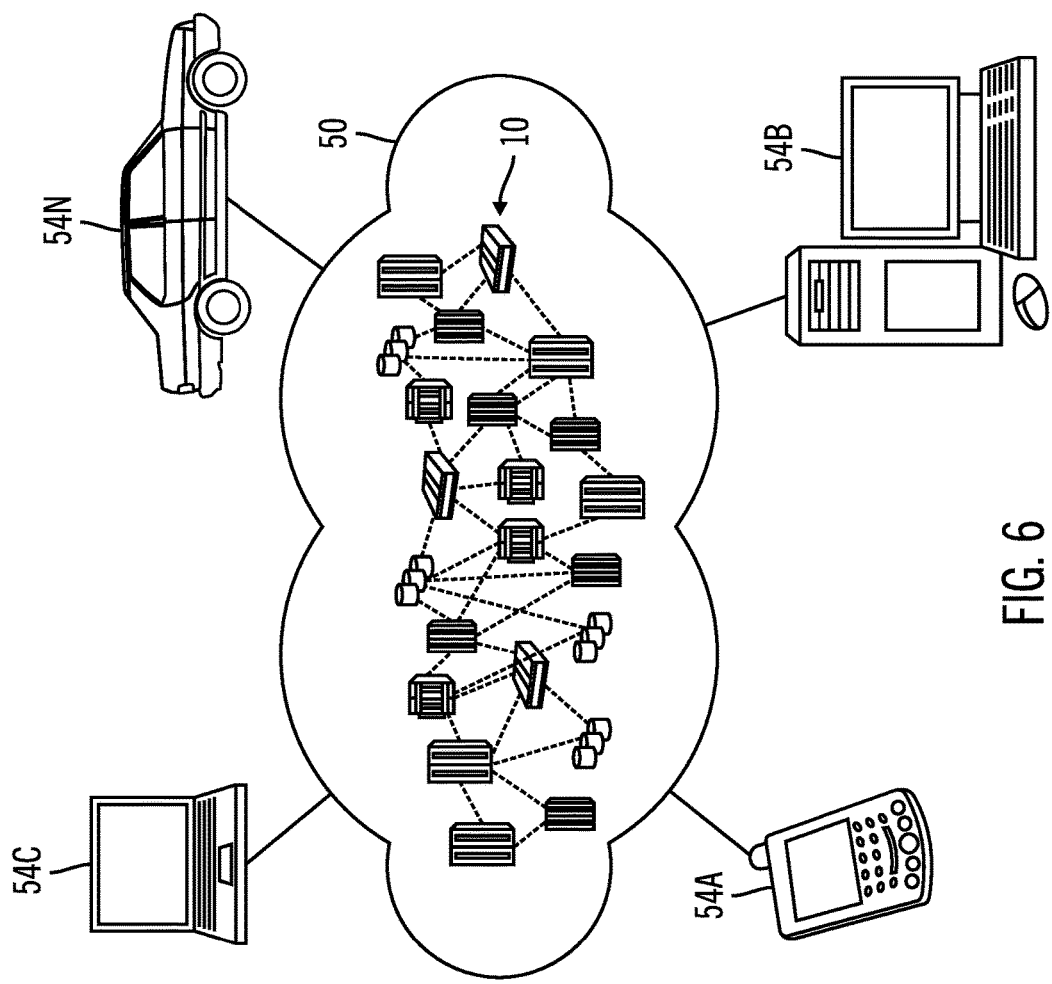
FIG. 6 illustrates a block diagram of a cloud computing environment, in accordance with certain embodiments.

Referring now to FIG. 6, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
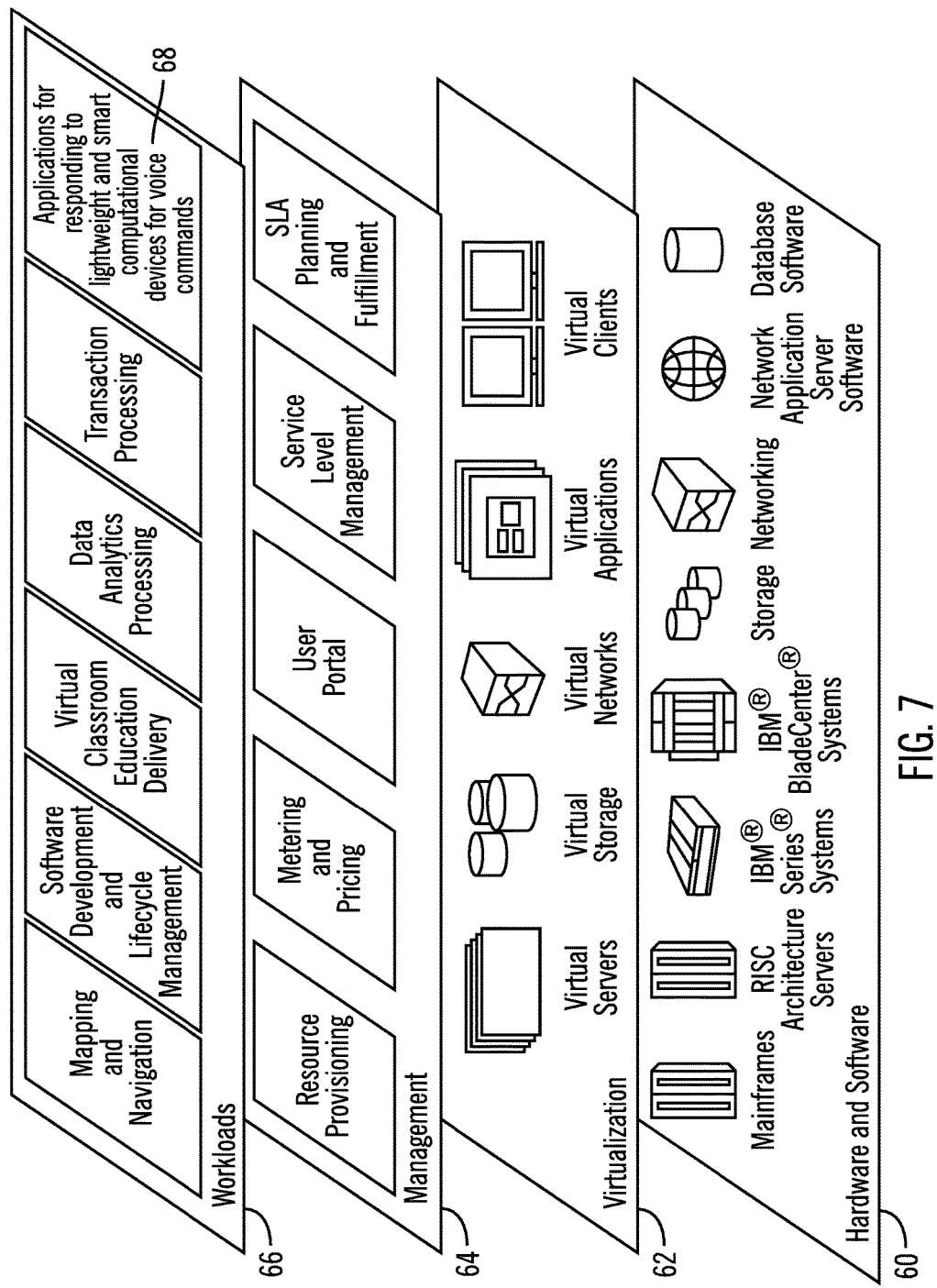
FIG. 7 illustrates a block diagram of further details of the cloud computing environment of FIG. 6, in accordance with certain embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and applications 68 for responding to lightweight and smart computational devices for voice commands as described in FIGS. 1-4, 5A, 5B.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 8:
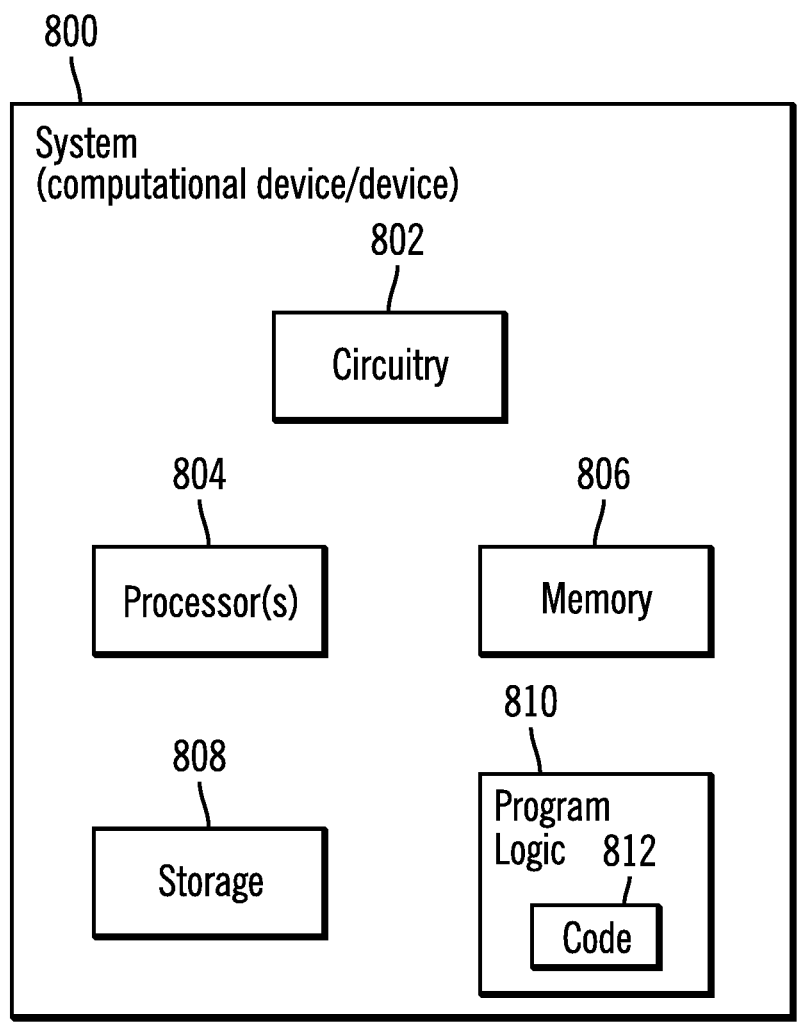
FIG. 8 illustrates a block diagram of a computational system that shows certain elements that may be included in the lightweight computational device, the smart computational device, or computational devices in the cloud, in accordance with certain embodiments.

FIG. 8 illustrates a block diagram that shows certain elements that may be included in one or more of the computational devices 102, 104, 202, 204a . . . 204n, 302, 308 in accordance with certain embodiments. The system 800 may include a circuitry 802 that may in certain embodiments include at least a processor 804. The system 800 may also include a memory 806 (e.g., a volatile memory device), and storage 808. The storage 808 may include a non-volatile memory device (e.g., EEPROM, ROM, PROM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:
1. A method, comprising:
 transmitting in a session, by a first computational device comprising a wearable computing device to a second computational device via Bluetooth, a voice command from a user, wherein the first computational device does not have adequate processing power to convert the voice command to a text command, and wherein the second computational device converts the voice command to the text command, and then transmits the text command to a cloud for being processed by a third computational device in the cloud;

receiving in the session, by the first computational device via the second computational device, a data response for the user from the third computational device in the cloud;

transmitting in the session, by the first computational device, another voice command to the cloud via Internet, without the another voice command being transmitted via the second computational device, wherein the voice command is converted to another text command in the cloud via voice recognition services executing in the third computational device, and wherein one or more of services provided by a fourth computational device in the cloud are used to generate another data response by executing the another text command; and receiving in the session, by the first computational device, from the cloud, the another data response, without the another data response being transmitted through the second computational device, wherein the first computational device does not have adequate processing power to convert the another voice command to a text command, and wherein the second and the third computational devices have adequate processing power to convert voice commands to text commands.

2. The method of claim 1, the method further comprising:
using, the one or more of services provided by the cloud to generate the data response by executing the text command received from the second computational device; and transmitting, by the cloud, the data response to the second computational device.

3. The method of claim 1, wherein:
the cloud is comprised of one or more computational devices.

4. The method of claim 1, wherein:
the first computational device comprising the wearable computing device is an in-car voice interaction system; and
the second computational device is a smartphone that interacts with the cloud via a wireless communications protocol.

5. The method of claim 1, wherein computational devices that provide the voice recognition services and the one or more of services in the cloud have a relatively greater processing power than the first computational device.

6. The method of claim 1, wherein the first computational device comprising the wearable computing device is a lightweight computational device, and wherein the second computational device is a smart computational device that has relatively greater processing power than the lightweight computational device.

7. A first computational device, comprising:
a processor; and
a computer readable storage medium having program instructions embodied therewith, the program instructions executable by the processor to cause the processor to perform operations, the operations comprising:
transmitting in a session, by the first computational device comprising a wearable computing device to a second computational device via Bluetooth, a voice command from a user, wherein the first computational device does not have adequate processing power to convert the voice command to a text command, and wherein the second computational device converts the voice command to the text command, and then transmits the text command to a cloud for being processed by a third computational device in the cloud;

receiving in the session, by the first computational device via the second computational device, a data response for the user from the third computational device in the cloud;

transmitting in the session, by the first computational device, another voice command to the cloud via Internet, without the another voice command being transmitted via the second computational device, wherein the voice command is converted to another text command in the cloud via voice recognition services executing in the third computational device, and wherein one or more of services provided by a fourth computational device in the cloud are used to generate another data response by executing the another text command; and receiving in the session, by the first computational device, from the cloud, the another data response, without the another data response being transmitted through the second computational device, wherein the first computational device does not have adequate processing power to convert the another voice command to a text command, and wherein the second and the third computational devices have adequate processing power to convert voice commands to text commands.

8. The first computational device of claim 7, the operations further comprising:
using, the one or more of services provided by the cloud to generate the data response by executing the text command received from the second computational device; and transmitting, by the cloud, the data response to the second computational device.

9. The first computational device of claim 7, wherein:
the cloud is comprised of one or more computational devices.

10. The first computational device of claim 7, wherein:
the first computational device comprising the wearable computing device is an in-car voice interaction system; and
the second computational device is a smartphone that interacts with the cloud via a wireless communications protocol.

11. The first computational device of claim 7, wherein computational devices that provide the voice recognition services and the one or more of services in the cloud have a relatively greater processing power than the first computational device.

12. The first computational device of claim 7, wherein the first computational device comprising the wearable computing device is a lightweight computational device, and wherein the second computational device is a smart computational device that has relatively greater processing power than the lightweight computational device.

13. A computer program product, the computer program product comprising a computer readable storage medium having program instructions embodied therewith, the program instructions executable by a processor included in a first computational device to cause the processor to perform operations, the operations comprising transmitting in a session, by the first computational device comprising a wearable computing device to a second computational device via Bluetooth, a voice command from a user, wherein the first computational device does not have adequate processing power to convert the voice command to a text command, and wherein the second computational device converts the voice command to the text command, and then transmits the text command to a cloud for being processed by a third computational device in the cloud;

receiving in the session, by the first computational device via the second computational device, a data response for the user from the third computational device in the cloud;

transmitting in the session, by the first computational device, another voice command to the cloud via Internet, without the another voice command being transmitted via the second computational device, wherein the voice command is converted to another text command in the cloud via voice recognition services executing in the third computational device, and wherein one or more of services provided by a fourth computational device in the cloud are used to generate another data response by executing the another text command; and receiving in the session, by the first computational device, from the cloud, the another data response, without the another data response being transmitted through the second computational device, wherein the first computational device does not have adequate processing power to convert the another voice command to a text command, and wherein the second and the third computational devices have adequate processing power to convert voice commands to text commands.

14. The computer program product of claim 13, the operations further comprising:

using, the one or more of services provided by the cloud to generate the data response by executing the text command received from the second computational device; and transmitting, by the cloud, the data response to the second computational device.

15. The computer program product of claim 13, wherein:
the cloud is comprised of one or more computational devices.

16. The computer program product of claim 13, wherein:
the first computational device comprising the wearable computing device is an in-car voice interaction system; and the second computational device is a smartphone that interacts with the cloud via a wireless communications protocol.

17. The computer program product of claim 13, wherein computational devices that provide the voice recognition services and the one or more of services in the cloud have a relatively greater processing power than the first computational device.

18. The computer program product of claim 13, wherein the first computational device comprising the wearable computing device is a lightweight computational device, and wherein the second computational device is a smart computational device that has relatively greater processing power than the lightweight computational device.

\* \* \* \* \*